United States Patent
Arai et al.

(10) Patent No.: US 6,456,286 B1
(45) Date of Patent: Sep. 24, 2002

(54) APPARATUS AND METHOD FOR DISPLAYING THREE-DIMENSIONAL POLYGONS

(75) Inventors: Masatoshi Arai; Ryosuke Miyata, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/443,140

(22) Filed: Nov. 19, 1999

(30) Foreign Application Priority Data

Feb. 23, 1999 (JP) .......................................... 11-044165

(51) Int. Cl.[7] .............................................. G06T 15/30
(52) U.S. Cl. ...................................... 345/423; 345/428
(58) Field of Search ................................ 345/419, 428, 345/423, 420

(56) References Cited

U.S. PATENT DOCUMENTS 5,577,960 A * 11/1996 Sasaki
6,201,542 B1 * 3/2001 Arai et al. .................. 345/419
6,313,838 B1 * 11/2001 Deering ...................... 345/420

FOREIGN PATENT DOCUMENTS

JP 2000242807 A * 9/2000 ........... G06T/15/00

* cited by examiner

Primary Examiner—Mark Zimmerman
Assistant Examiner—Naa Oboshie Alexander-Reindorf
(74) Attorney, Agent, or Firm—Staas & Halsey LLP (57) ABSTRACT

A polygon rendering capability detecting part detects the rendering capability of the equipment used so as to calculate the total number of polygons $N_{ap}$ that can be allocated in one frame. A visual quality determining part determines an average area $S_p$ represented by one polygon on a display screen as visual quality, and an optimum polygon number calculating part calculates the optimum number of polygons $N_p$ that can be allocated based on the size of a three-dimensional character projected on the display screen while maintaining the visual quality $S_p$ constant. A polygon number adjusting part lowers the progressive polygon level of the three-dimensional character so that the number of polygons of the three-dimensional character is not less than the calculated optimum number of polygons and is the smallest number of polygons to which the number of polygons can be reduced. When the three-dimensional character moves and the Z value is changed, $N_p$ is updated so that $S_p$ becomes constant.

14 Claims, 6 Drawing Sheets

APPARATUS AND METHOD FOR DISPLAYING THREE-DIMENSIONAL POLYGONS

BACKGROUND OF THE INVENTION

1. Field of the Invention

The present invention relates to a three-dimensional polygon display apparatus using progressive polygon data for rendering an object with the number of polygons that is available in the rendering conditions of the equipment used.

In particular, the present invention relates to a three-dimensional polygon display apparatus for calculating an optimum number of polygons to be allocated to a three-dimensional character according to the polygon processing capacity of the three-dimensional polygon display environment and according to the displaying position of the three-dimensional character in order to display the three-dimensional character in a progressive polygon level corresponding to the optimum number of polygons.

2. Description of the Related Art

With high performance of current computer systems and development of multimedia processing techniques, an environment where advanced three-dimensional computer graphics can be processed on personal computers is emerging, and accelerator boards dedicated to three-dimensional graphics processing are being provided. With the improvement of graphics processing capability, high-end personal computers that have a high processing capability can display a three-dimensional character with sufficiently high quality and are comparable to graphic workstations (GWS) that are dedicated to that purpose. However, widely spread personal computers used by general users are not always provided with a graphic accelerator or a high performance CPU, and the hardware specification of many of them cannot cope with real-time display processing of a three-dimensional character sufficiently. Moreover, the level of the hardware specification varies from relatively high to low. Therefore, in order to compensate for the widely varied difference in hardware performance and to realize display processing of a three-dimensional character with at least a certain level of quality by various display environments, it is necessary to supplement insufficiency of hardware processing performance with advantageous software processing. Thus, it is essential to improve software processing systems.

There are various types of data formats for computer graphics. In games employing the motions of objects of artificial creature characters which are used by general users, in general, data regarding objects is stored primarily in the form of polygons, and high speed rendering is performed by generating a polygon mesh and attaching a texture to the polygon mesh. The processing performance consumed by rendering of a three-dimensional character (hereinafter, referred to as "rendering cost") depends on the number of polygons that are processed for display.

In order to display graphics with high quality, the larger number of polygons are allocated to a three-dimensional character, the better the display result is. However, in the case where polygons are displayed in real-time, there are limitations to the number of polygons that can be displayed at the same time. For example, in the case where real-time processing is performed by using a current personal computer as the platform, it is said that it is necessary to limit the number of polygons to about 2000 per frame. Generally, in animation design and production, the number of polygons of a three-dimensional character and the frame rate are set to be low based on the lowest level of hardware specification that end-users use. Therefore, a display environment having high hardware performance uses only a small proportion of its capability to perform display processing of a three-dimensional character, and most of the hardware processing capability is idle, whereas the picture quality is low. On the other hand, when the number of polygons of a three-dimensional character and the frame rate are set to be high corresponding to the highest level of hardware specification that can be used by end-users, real-time display processing cannot be performed in the display environments of many end-users because of their insufficient processing capability.

Conventional methods for alleviating the problem of the imbalance between the processing capability level of an individual display environment and the picture quality of an actually displayed three-dimensional character that is caused by the variation in hardware performance of three-dimensional polygon display environments used by end-users include the followings.

As a first method, a plurality of polygon models of several patterns are prepared, and the number of polygons allocated to a three-dimensional character is changed in accordance with the motion of the three-dimensional character. For example, a polygon model for a close range, a polygon model for an intermediate range and a polygon model for a remote range of a character are prepared, and a suitable one of these polygon models is selected based on the position of the three-dimensional character to be displayed from the viewpoint so that the rendering cost can be reduced even to a small extent. However, the methods for preparing the plurality of polygon models have the following problems. A first problem is that animation data is required for each polygon model to be prepared, so that the data amount becomes enormous. A second problem is that when a three-dimensional character moves and the polygon models are switched, the difference in resolution of the displayed three-dimensional character between before and after the movement is outstanding. These problems require the first conventional method to be improved.

As a second method, progressive polygons are used. The progressive polygon data that are used in a three-dimensional polygon display apparatus using progressive polygon data are polygon data having a hierarchy corresponding to the levels of the resolution and the degree of details of an object to be displayed. The progressive polygon data are characterized in that the number of polygons is increased or decreased by changing the progressive polygon level dynamically in accordance with the display conditions and vertexes of a polygon mesh are formed. The progressive polygon data consists of basic polygon data and detailed polygon data. The basic polygon data are the roughest polygon data, which is the basis, and the detailed polygon data are data described relatively with respect to the basic polygon data. The levels of the progressive polygons are set to be in proportion to a distance Z between the position of a three-dimensional character to be displayed and a camera, and the number of polygons to be allocated can be reduced in accordance with the progressive polygon level. With this method, the number of polygon N is represented by $N = kN_1/Z$, and the number of polygon is reduced in inverse proportion to Z for reproduction. Herein, k is a coefficient, and $N_1$ is the number of polygons of the most detailed level. This method is advantageous in that the rendering cost can be suppressed because the number of polygons to be allocated can be reduced in accordance with the position of a three-dimensional character to be displayed.

However, in this method, the number of polygons to be allocated cannot be adjusted individually according to the processing capability of the three-dimensional polygon display environment used. Furthermore, generally, whether or not the number of polygons allocated to a three-dimensional character is excessive for the scene can be determined by whether or not the quality perceived by the user (visibility) with respect to the three-dimensional character rendered with that number of polygons can be maintained at a certain level or thereabove. However, in the second method, although the number of polygons is changed dynamically in accordance with the position of the three-dimensional character to be displayed, namely, the correlation between the position of the three-dimensional character to be displayed and the number of polygons to be allocated is utilized, the level of the visibility of the user is not necessarily taken into direct account.

SUMMARY OF THE INVENTION

Therefore, with the foregoing in mind, it is an object of the present invention to provide a technique that compensates for the difference in hardware performance between varied three-dimensional polygon display environments and that dynamically calculates the optimum number of polygons commensurate with the graphics processing capability of each three-dimensional polygon displayenvironment actually used by a user, and increases or decreases the number of polygons of the three-dimensional character individually for each three-dimensional polygon display environment for customization and optimization, thereby ensuring the highest display quality that can be achieved by the rendering cost allowed for each three-dimensional polygon display environment.

Furthermore, it is another object of the present invention to provide a three-dimensional polygon display apparatus that can adjust dynamically the number of polygons to be allocated to a three-dimensional character in accordance with the scene so that the picture quality perceived by the user is in a predetermined level.

A three-dimensional polygon display apparatus using progressive polygon data for forming a polygon mesh of a three-dimensional character of the present invention includes a visual quality determining part for determining visual quality that is defined by an average area screen represented by one polygon on a display and indicates picture quality perceived by a user; an optimum polygon number calculating part for calculating the number of polygons that can be allocated to the three-dimensional character while maintaining the determined visual quality constant as the optimum number of polygons; and a polygon number adjusting part for adjusting a progressive polygon level so that the number of polygons of the three-dimensional character is not less than the calculated optimum number of polygons and is the smallest number of polygons to which the number of polygons can be reduced.

This embodiment can optimize the number of polygons in accordance with the capability of reproduction equipment, and ensure the highest display quality within the rendering cost allowed for the three-dimensional polygon display apparatus. Furthermore, in display of a three-dimensional character, the average area covered by one polygon on a display screen can be constant regardless of the scene to be displayed or the Z value of the three-dimensional character, and the visual quality, which is a degree of visual details of representation on the screen, namely, picture quality perceived by the user, can be constant.

It is preferable that the visual quality determining part calculates the visual quality $S_p$ using a unit length w [pixels] on a display screen, an area $S_r$ of the three-dimensional character, the total number of polygons $N_{ap}$ that can be rendered in one frame, a distance Z between the three-dimensional character and a camera, and ½ of an angle of view θ from the camera to the display screen as parameters according to Equation 3.

Equation 3

$$Sp = \left(\frac{w}{2Z\tan\frac{\theta}{2}}\right)^2 Sr \bigg/ \frac{Nap}{2} = \frac{W^2 Sr}{2NapZ^2\tan^2\frac{\theta}{2}} \qquad \text{Equation 3}$$

This embodiment allows an average area covered by one polygon on a display screen to be calculated and provides an example of a specific processing procedure with which the visual quality $S_p$ is calculated.

It is preferable that the optimum polygon number calculating part calculates the optimum number of polygons $N_p$ using a unit length w [pixels] on a display screen, an area $S_r$ of the three-dimensional character, a distance Z between the three-dimensional character and a camera, ½ of an angle of view from the camera to the display screen, and the visual quality $S_p$ as parameters according to Equation 4.

Equation 4

$$Np = \frac{w^2}{2Z^2\tan^2\frac{\theta}{2}} \frac{Sr}{Sp} \qquad \text{Equation 4}$$

With this embodiment, the number of polygons to be allocated to the three-dimensional character can be determined so that the visual quality $S_p$ is constant, and an example of processing procedure that optimizes the number of polygons to be allocated while maintaining the picture quality perceived by the user at a predetermined level can be provided.

As described above, the optimum number of polygons can be allocated so that the average area covered by one polygon on the display screen can be constant regardless of the scene to be displayed or the Z value of the three-dimensional character, and the visual degree of the details represented on the screen and the visual quality, which is picture quality perceived by the user can be constant. Thus, the progressive polygon level of the three-dimensional polygons can be adjusted and the number of polygons can be reduced.

In the case where the three-dimensional polygon display apparatus is not used exclusively for computer graphics but is used in an environment where a plurality of applications can be executed with multi-windows, the polygon rendering capability can be detected in view of the processing capability that actually is allowed for rendering polygons.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the accompanying drawings. First, the basic principle of the present invention will be described, and then examples of apparatus configuration will be described.

First, the basic principle of the present invention will be described.

A first principle of a three-dimensional polygon display apparatus of the present invention is as follows. The total number of polygons that can be handled in one frame is calculated based on the graphic processing capability of a three-dimensional polygon display environment actually used by the user, and the total number of polygons to be allocated to the entire screen of the three-dimensional polygon display is adjusted dynamically so as to correspond to the calculated number of polygons. According to this principle, whichever three-dimensional polygon display is used, a three-dimensional character that exists in a frame can be rendered with the tonal number of polygons that is allowed for the graphics processing capability determined by the specification thereof In other words, the three-dimensional character can be rendered with the largest number of polygons that can be allocated by utilizing the provided graphics processing capability to the maximum.

A second principle of the three-dimensional polygon display apparatus of the present invention is as follows. The number of polygons to be allocated is reduced in accordance with the position of a three-dimensional character to be displayed while the perceived quality of the three-dimensional character rendered is maintained at a certain level. The number of polygons can be reduced by calculating the optimum number of polygons to be allocated to the three-dimensional character by the rule of maintaining the visual quality as described below at a certain level.

Hereinafter, a method for calculating the visual quality and the optimum number of polygons will be described in detail.

It is possible to display a character positioned far away from the camera with an appropriately reduced number of polygons without degrading the perceived picture quality. In other words, it is possible to save the rendering cost effectively by changing the number of polygons as appropriate, depending on the distance Z between the camera and the three-dimensional character. Thus, when the visual quality is defined based on the performance of the three-dimensional polygon display environment, display with polygons suitable for the three-dimensional polygon display environment can be performed.

Figure 1:
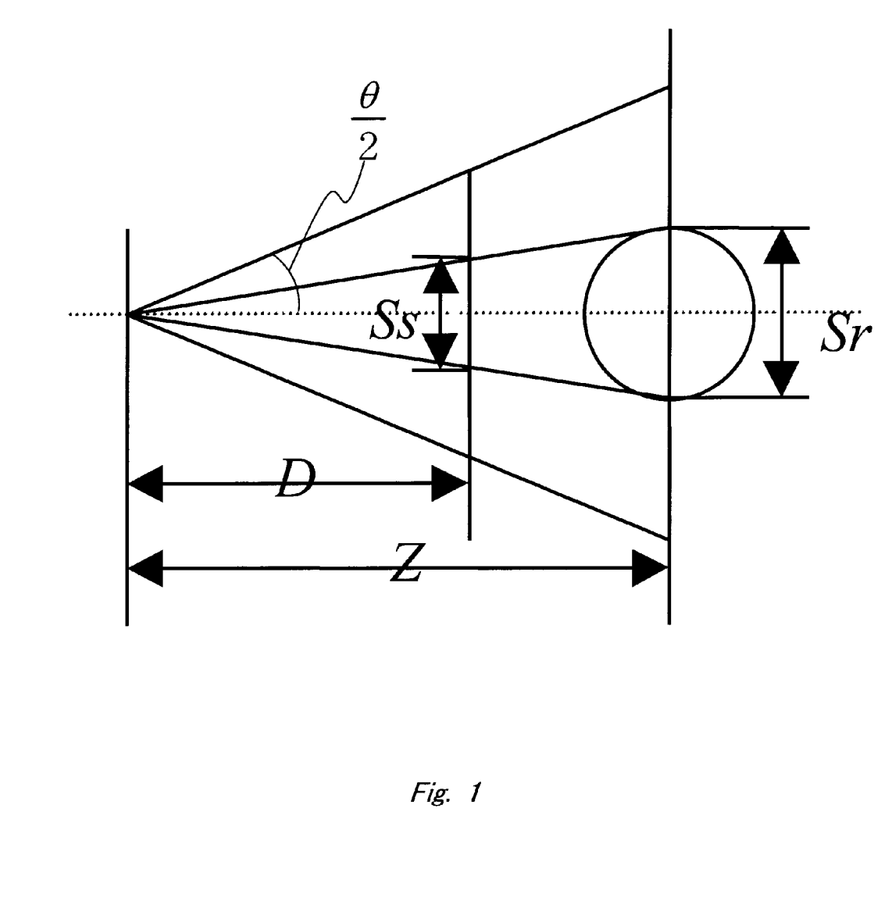
FIG. 1 is a diagram showing a projection on a display screen of a three-dimensional character for illustrating the basic principle of the present invention.

More specifically, the calculation of the optimum number of polygons of a three-dimensional character based on the distance from the camera will be described. It is assumed that a character is projected on a display screen while the character is positioned at a distance Z away from the camera, and the display screen is positioned at a distance D away, as shown in FIG. 1. The angle of view from the camera to the display screen is θ/2. $S_r$ is an area of the three-dimensional character projected in front, and $S_s$ is an area thereof on the display screen. The area $S_s$ can be represented by Equation 5, where w [pixel] is a unit length on the display screen.

Equation 5

$$Ss = \left(\frac{D}{Z}\right)^2 Sr \qquad \text{Equation 5}$$

derived from $Z^2:Sr=D^2:Ss$      Equation 5

The unit system is converted from the model unit system (cm in this embodiment) to the pixel unit system (pixel) so that the area "s" in pixel unit system is calculated.

Equation 6

$$\alpha = \frac{w}{2D\tan\frac{\theta}{2}} \text{ [pixels/cm]} \qquad \text{Equation 6}$$

derived from $2D \tan \theta/2[\text{cm}]=w[\text{pixels}]$      Equation 6

The area "s" on the display screen can be represented in the number of pixels by Equation 7 from Equations 5 and 6.

Equation 7

$$s = Ss \times \alpha^2 = \left(\frac{D}{Z}\right)^2 Sr \times \left(\frac{w}{2D\tan\frac{\theta}{2}}\right)^2 = \left(\frac{w}{2Z\tan\frac{\theta}{2}}\right)^2 Sr \qquad \text{Equation 7}$$

In the case where the polygons are assumed to be distributed uniformly with respect to the three-dimensional character and the number of all polygons is represented by $N_{ap}$, the number of polygons projected is $N_{ap}/2$, because approximately a half of the polygons are projected. Herein, an average area $S_p$ (average number of pixels) per polygon can be calculated according to Equation 8. In Equation 8, $S_p$ is regarded as the visual quality. In Equation 8, $N_{ap}$ is always constant regardless of the scene. The number of polygons ($N_p$) can be calculated according to Equation 9 while the visual quality $S_p$ is maintained constant.

Equation 8

$$Sp = \left(\frac{w}{2Z\tan\frac{\theta}{2}}\right)^2 Sr \Big/ \frac{Nap}{2} = \frac{w^2 Sr}{2NapZ^2\tan^2\frac{\theta}{2}} \qquad \text{Equation 8}$$

Equation 9

$$Np = \frac{w^2}{2Z^2\tan^2\frac{\theta}{2}} \frac{Sr}{Sp} \qquad \text{Equation 9}$$

Equation 9 indicates that the number of polygons $N_p$ of the character is in inverse proportion to the square of the distance Z between the character and the camera. When the visual quality ($S_p$) is calculated from parameters derived from the performance of the three-dimensional polygon display environment, displaying that is customized to each three-dimensional polygon display environment is possible.

Figure 2:
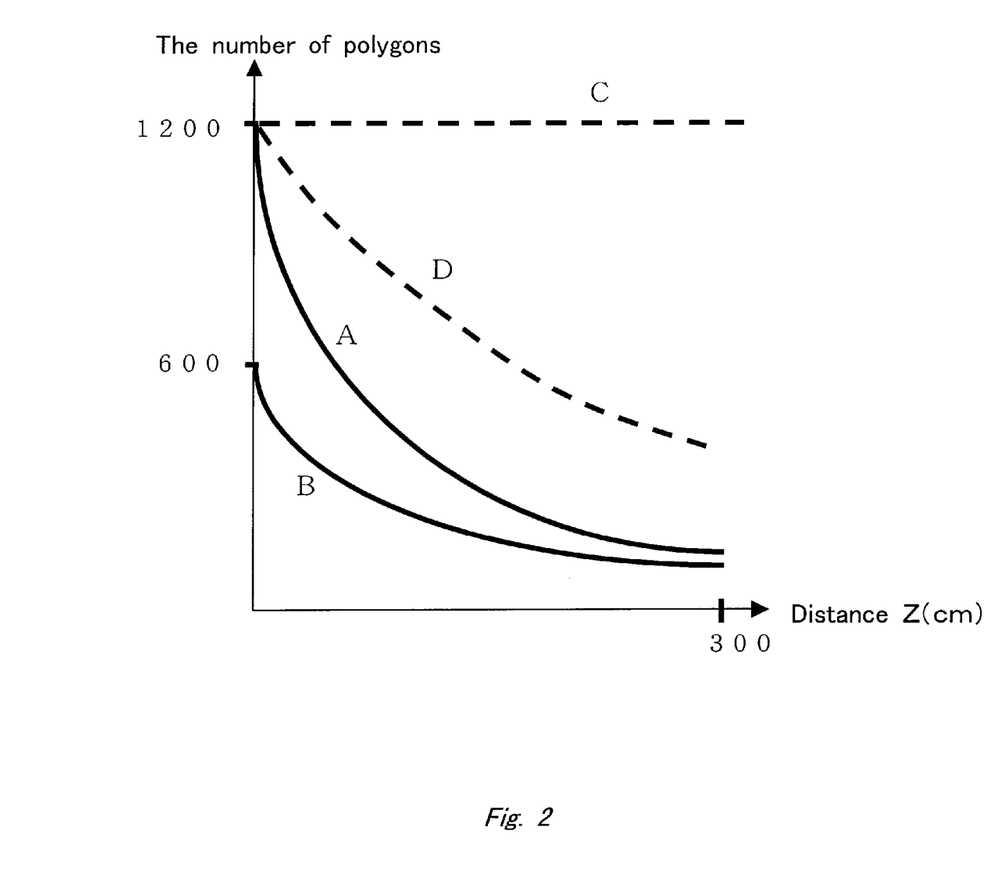
FIG. 2 is a graph showing the relationship between the distance Z and the optimum number of polygons.

FIG. 2 shows the relationship between the distance Z and the optimum number of polygons. In this graph, dotted line C on the top indicates a conventional case where the number of polygon is constant (e.g., constant at 1200 polygons). Dotted line D indicates a conventional case where the progressive polygon level is changed depending on the Z value. Solid line A indicates a case where the system for allocating the optimum number of polygons of the present invention is used with $N_{ap}$=1200 polygons. Solid line B indicates a case where the system for allocating the optimum number of polygons of the present invention is used with $N_{ap}$=600 polygons. As seen from FIG. 2, the number of polygons to be allocated according to the present invention can be reduced to a greater degree than the conventional examples. Moreover, the number of polygons to be allocated is reduced while the picture quality perceived by the user is maintained at a certain level. When the optimum number of polygons is calculated in accordance with the Z value in this manner for rendering, the rendering period can be reduced while the visual quality is maintained.

More specifically, the rendering period can be calculated as follows.

Now, it is assumed that a three-dimensional character moves along a distance Z of 125 to 300 cm (first travel) and comes back along the same path (second travel). Since the rendering period is in proportion to the number of polygons (herein, the proportional coefficient is represented by k), a rendering period Tconst and a rendering period Toptimum can be calculated as shown in Equations 10 and 11, where the rendering period Tconst is a period required for the first travel in the case where the number of polygons is constantly 1200, and the rendering period Toptimum is a period required for the first travel in the case where the system for allocating the optimum number of polygons of the present invention is used.

Equation 10

$$Tconst = k \int_{125}^{300} Np(z)dz = k \int_{125}^{300} 1200\,dz = 210 \times 10^3 k \quad \text{Equation 10}$$

Equation 11

$$Toptimum = k \int_{125}^{300} \frac{1800 \times 10^4}{z^2} dz = 87.5 \times 10^3 k \quad \text{Equation 11}$$

As seen from Equations 10 and 11, when the system for allocating the optimum number of polygons of the present invention is used, the rendering cost can be reduced to 1/(2.4). Furthermore, in the case of the three-dimensional polygon display apparatus having low processing performance as shown by solid line B in the graph of FIG. 2, it is possible to reduce the rendering period further, if a polygon rendering capability detecting part or a user designation condition input part, which will be described later, is provided in order to degrade the visual quality in accordance with the rendering environments, for example, reduced to ½. In this case, when the number of polygons according to the processing capability of the equipment is calculated, the visual quality is reduced to ½. However, rendering can be performed while this visual quality is maintained constant.

It is possible to calculate the optimum number of polygons that maintains picture quality constant by determining picture quality based on the machine performance in this manner. In the polygon reduction process for progressive polygons by changing the progressive polygon level, in the case where the number of polygons after the reduction process does not match any optimum numbers of polygons so that there is no corresponding progressive polygon level, the progressive polygon level is adjusted to the progressive polygon level where the number of polygons to be allocated is nearest to the optimum number of polygons, namely, is not less than the optimum number and is the smallest possible number of polygons by polygon reduction.

The basic principle of the processing operation of the three-dimensional polygon display apparatus of the present invention has been described. Maintaining the visual quality constant means that the size of the coverage of one polygon on the display screen is maintained constant. This principle allows the average area represented by one polygon on the display screen to be constant, even if the position of the three-dimensional character displayed is changed. Therefore, the degree of details represented by polygons and the quality perceived by the user can be maintained at a certain level, regardless of a three-dimensional character positioned near and displayed in a large size, or a three-dimensional character positioned far away and displayed in a small size.

Next, embodiments of the three-dimensional polygon display apparatus of the present invention to which the basic principle as described above is applied will be described below.

Embodiment 1

Embodiment 1 shows an embodiment of the three-dimensional polygon display apparatus of the present invention.

The three-dimensional polygon display apparatus of Embodiment 1 will be described with reference to FIG. 3.

Figure 3:
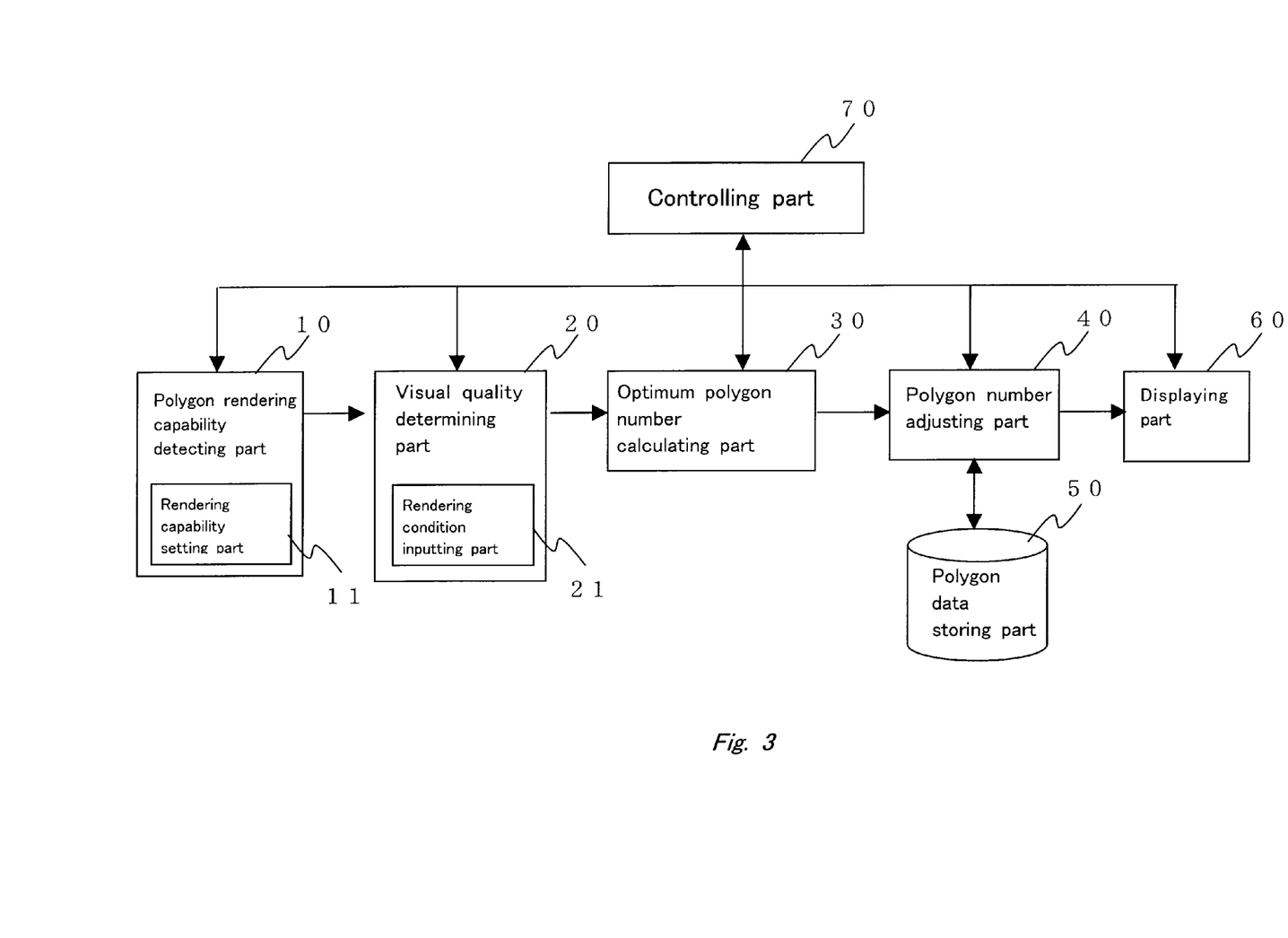
FIG. 3 is a schematic block diagram of a three-dimensional polygon display apparatus of Embodiment 1 of the present invention.

In FIG. 3, numeral 10 denotes a polygon rendering capability detecting part, numeral 20 denotes a visual quality determining part, numeral 30 denotes an optimum polygon number calculating part, numeral 40 denotes a polygon number adjusting part, numeral 50 denotes a polygon data storing part, numeral 60 denotes a displaying part, and numeral 70 denotes a controlling part.

The polygon rendering capability detecting part 10 of Embodiment 1 detects the rendering capability defined by the hardware processing capability of the equipment used by the user. In Embodiment 1, the polygon rendering capability detecting part 10 includes a rendering capability setting part 11 with which the user further can adjust the rendering capability. The polygon rendering capability detecting part 10 detects the polygon rendering capability of the equipment used by the user based on the processing capability of the CPU used by the equipment, the presence or absence of a graphic accelerator and the capability thereof and the like, and detects the number of polygons $N_{ap}$ that can be processed. The rendering setting part 11 is an input part to which the user inputs information for designating reproduction conditions. For example, the user can input instructions to change the number of polygons $N_{ap}$ that can be processed or to upgrade or degrade the picture quality. In the case where an instruction to upgrade or degrade the picture quality is input, for example, a coefficient α is assigned to the total number of polygons $N_{ap}$ that can be processed, and α is increased or decreased. For example, α can be decreased by 10% to each information input that instructs further degradation of the picture quality, which results in a α=0.9 and the number of polygons after adjustment can be assigned as 0.9 $N_{ap}$. Herein, $N_{ap}$ is the same $N_{ap}$ as used in Equation 8.

The visual quality determining part 20 is a part for determining the visual quality $S_p$, which is quality perceived by the user, according to Equation 8 based on the number of polygons $N_{ap}$ that can be processed obtained by the polygon rendering capability detecting part 10. The visual quality $S_p$ is an average area (average number of pixels) that is represented by one polygon and is calculated with Equation 8, as described with respect to the basic principle of the present invention. The visual quality determining part 20 includes means for processing Equation 8. The visual quality determining part 20 includes a rendering condition input part 21 so as to obtain other parameters necessary for executing the calculation of Equation 8, such as the unit length W of the display screen, the area "s" of the three-dimensional character projected in front, the distance Z between the camera and the three-dimensional character, and the angle of view θ/2 from the camera to the display screen.

The optimum polygon number calculating part 30 is a part for calculating the optimum number of polygons $N_p$ to be allocated to the three-dimensional character to be rendered under the condition that the visual quality $S_p$ determined by the visual quality determining part 20 is maintained constant, based on Equation 9. As described with respect to the basic principle of the present invention, the optimum number of polygons $N_p$ can be calculated in accordance with the motion of the three-dimensional character as a value in inverse proportion to the square of the distance Z between the camera and the three-dimensional character. The optimum polygon number calculating part 30 includes means for processing Equation 9.

The polygon data storing part 50 is a storage in which progressive polygon model data of three-dimensional characters are stored, and supplies polygon data of the three-dimensional character to be rendered to the polygon number adjusting part 40.

The polygon number adjusting part 40 is a part for reducing or adjusting the number of polygons $N_{po}$ of the three-dimensional character to be rendered to the optimum number of polygons $N_p$ calculated by the optimum polygon number calculating part 30. In this process for reducing and adjusting the number of polygons, excessive polygons can be reduced while the visual quality is maintained constant at a predetermined level, and a suitable number of polygons can be allocated to the three-dimensional character. As the process for reducing the number of polygons from $N_{po}$ to the optimum number of polygons $N_p$, in Embodiment 1, the number of polygons is reduced by lowering the progressive polygon level. An example of this process for reducing the number of polygons by lowering the progressive polygon level will be described later. The polygon number adjusting part 40 creates a model having a necessary number of polygons by covering a rough basic polygon model with polygons.

The displaying part 60 is a display on which the three-dimensional character is displayed and can be any type of a display such as a CRT, a liquid crystal display or the like.

The controlling part 70 controls the entire apparatus. The description for the controlling part 70 and memories or devices necessary for the apparatus will be omitted herein.

Figure 4:
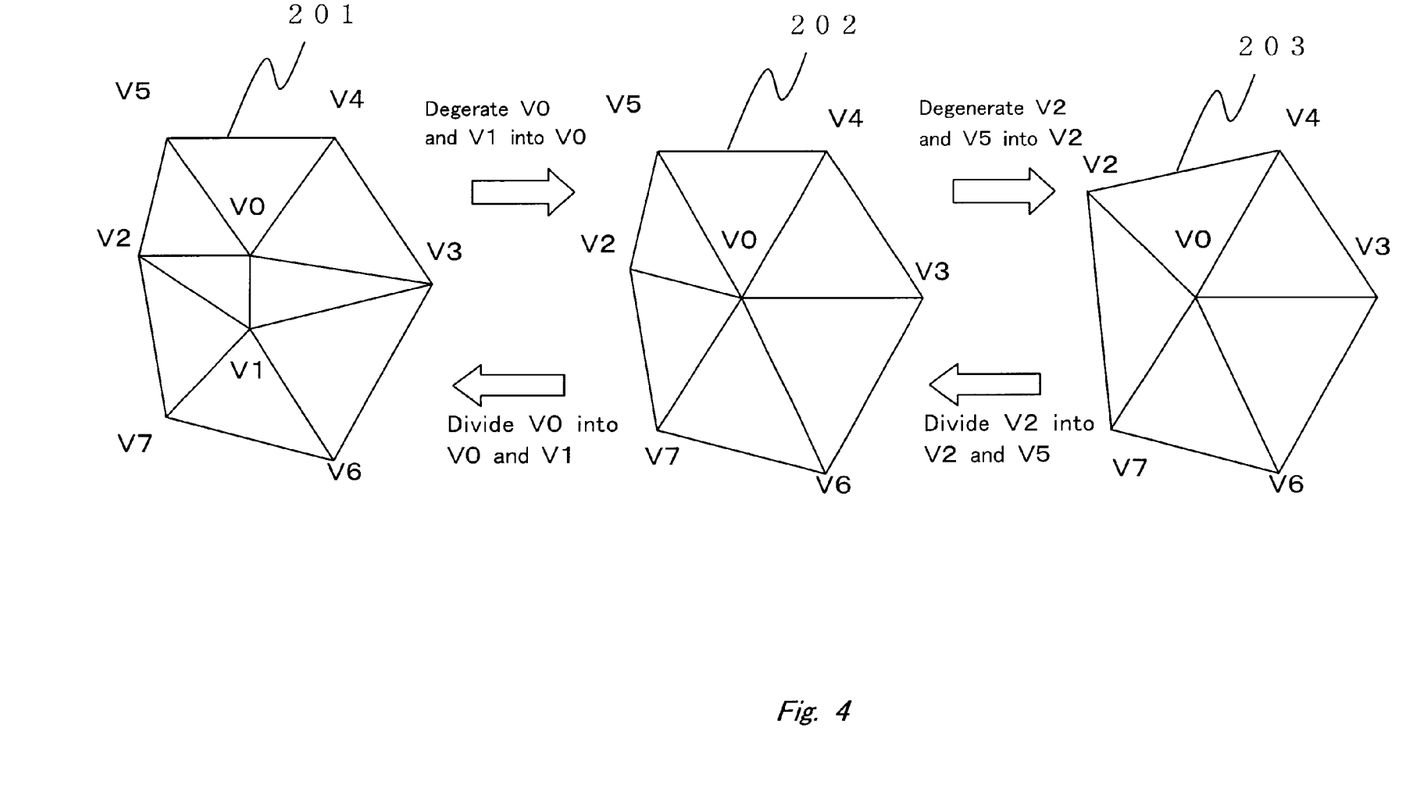
FIG. 4 is a diagram showing an example of a process for reducing the number of polygons by lowering the progressive polygon level used in Embodiment 1 of the present invention.

Next, an example of the process for reducing the number of polygons by lowering the progressive polygon level, which is used in Embodiment 1, will be described briefly. In FIG. 4, numeral 201 denotes a polygon mesh formed of progressive polygons in a certain level of the progressive polygon levels. Numeral 202 denotes a polygon mesh formed of progressive polygons in a progressive polygon level that is rougher by one level than the level of the polygon mesh 201. Numeral 203 denotes a polygon mesh formed of progressive polygons in a progressive polygon level that is rougher by one level than the level of the polygon mesh 202.

The polygon mesh 201 has 8 polygon vertexes V0 to V7. In order to reduce data amount, some of the polygon vertexes may be eliminated and removed (hereinafter, referred to as "degeneration"). For example, the rule of the degeneration is to degenerate one of two polygon vertexes whose distance therebetween is within the reference distance L, and the reference distance L of a certain progressive polygon level is $L_1$ and the reference distance L of a next rougher progressive polygon level is $L_2$. In the polygon mesh 201, the distance $L_{V0V1}$ between $V_0$ and $V_1$ satisfies $L_{V0V1} < L_1 < L_2$, and the distance $L_{V2V5}$ between $V_2$ and $V_5$ satisfies $L_1 < L_{V2V5} < L_2$, as shown in FIG. 4.

First, the transition from the progressive polygon data of the polygon mesh 201 to a rougher progressive polygon level by one level will be described. Since the reference distance L of the current progressive polygon level is $L_1$, one of the polygon vertexes V0 and V1 whose distance therebetween is less than $L_1$ should be degenerated. The polygon mesh 202 is obtained by integrating the polygon vertexes V0 and V1 into one polygon vertex so that the vertex V1 is degenerated and the newly formed polygon vertex is denoted as the vertex V0. The number of polygon vertexes is 7. Similarly, in formation of the next progressive polygon level, since the reference distance L is $L_2$, one of the polygon vertexes V2 and V5 should be degenerated. The polygon vertex V5 is degenerated so that the number of polygon vertexes of the polygon mesh 203 becomes 6. The hierarchical process as described above is applied to the entire object so as to obtain polygon data of each progressive polygon level, and the polygon data is stored as relative information between the levels. This storage allows the polygon data of each progressive polygon level to be interpolated or degenerated dynamically even if the progressive polygon level is changed.

As described above, the number of polygons to be allocated can be changed by transiting the level. The polygon number adjusting part 40 of the three-dimensional polygon display apparatus of Embodiment 1 performs the following process in the case where the number of polygons does not match any optimum number of polygons so that there is no corresponding progressive polygon level, or the number of polygons after the reduction process does not match any optimum number of polygons so that there is no corresponding progressive polygon level. The progressive polygon level is shifted to rougher levels sequentially until the number of polygons is not less than the optimum number of polygons and is the smallest number of polygons to which the number of polygons can be reduced. Then, the basic polygon model of the rougher progressive polygon level is covered with polygons so that a model having a necessary number of polygons can be created.

Thus, the three-dimensional polygon display apparatus of Embodiment 1 allows the average area covered by one polygon on the display screen to be constant, regardless of the scene to be displayed or the Z value of the three-dimensional character. Furthermore, the optimum number of polygons that maintains the visual degree of the details on the screen constant at a predetermined level, and the visual quality, which is picture quality perceived by the user, constant at a predetermined level can be allocated, and the progressive polygon level of the three-dimensional polygons is adjusted so as to reduce the number of polygons.

The method for calculating the visual quality $S_p$, the method for calculating the optimum number of polygons $N_p$, the process for reducing the number of polygons by lowering the level of the progressive polygon data, which are described specifically with the equations in this embodiment, are only illustrative so that the equations can be varied, as long as the same objects are achieved and the same effects result.

Embodiment 2

Embodiment 2 shows an embodiment of the three-dimensional polygon display apparatus of the present invention.

Hereinafter, Embodiment 2 will be described with reference to FIG. 5. In Embodiment 2, the three-dimensional polygon display apparatus is not used exclusively to computer graphics, but can be used in an environment where multitasks can be executed and a plurality of applications can be executed with multi-windows. Furthermore, the three-dimensional polygon display apparatus of Embodiment 2 detects the polygon rendering capability in view of the processing capability that actually can be used for rendering polygons of the hardware processing capability.

The three-dimensional polygon display apparatus of Embodiment 2 will be described with reference to FIG. 5.

Figure 5:
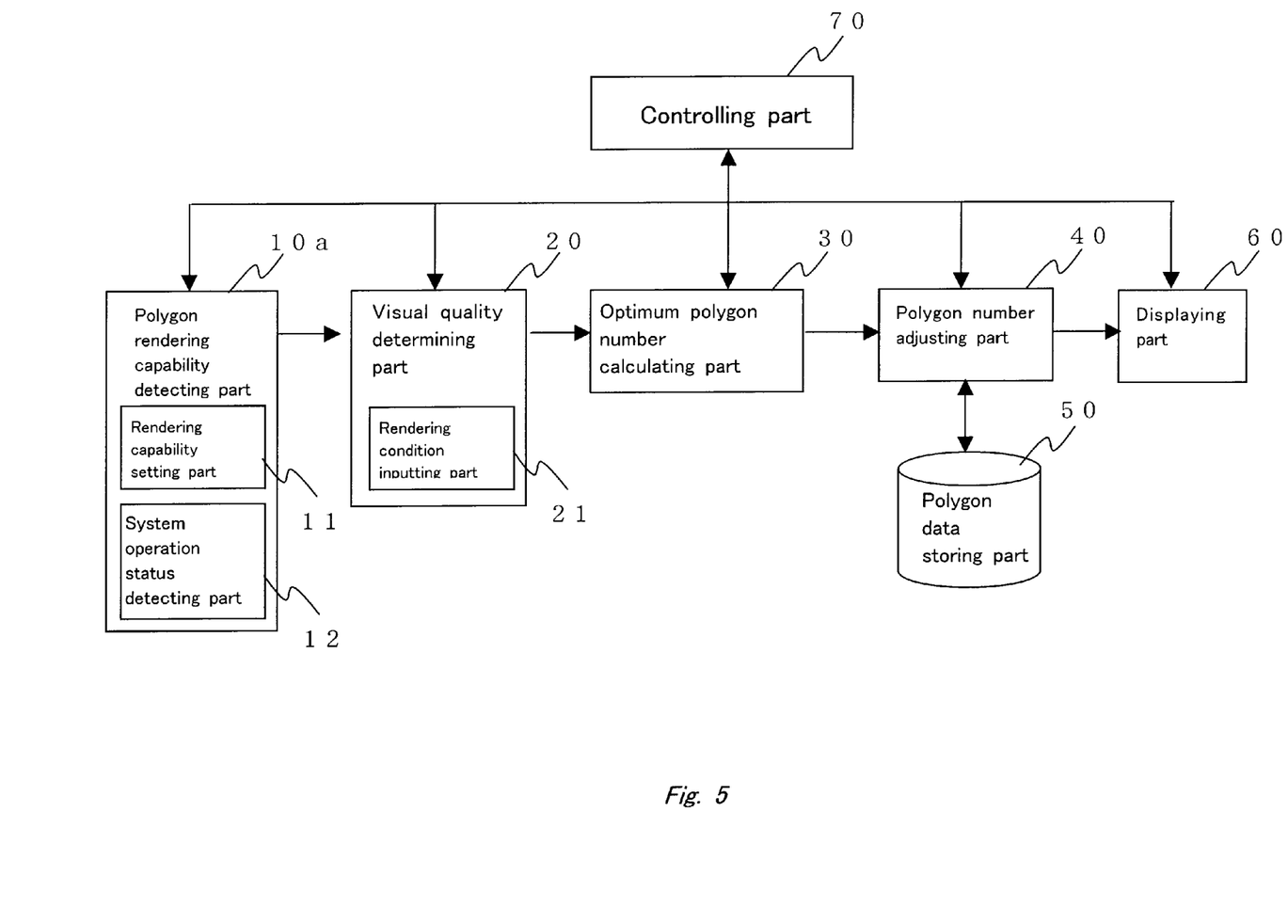
FIG. 5 is a schematic block diagram of a three-dimensional polygon display apparatus of Embodiment 2 of the present invention.

In FIG. 5, numeral 10a denotes a polygon rendering capability detecting part, numeral 11 denotes a rendering capability setting part, numeral 12 denotes a system operation status detecting part, numeral 20 denotes a visual quality determining part, numeral 30 denotes an optimum polygon number calculating part, numeral 40 denotes a polygon number adjusting part, numeral 50 denotes a polygon data storing part, and numeral 60 denotes a displaying part. The same elements as those of Embodiment 1 described with reference to FIG. 3 are assigned the same numerals used in FIG. 3 and will not be described further in Embodiment 2.

The basic operation of the polygon rendering capability detecting part 10a is the same as that of the polygon rendering capability detecting part 10 described in Embodiment 1, but further includes a system operation status detecting part 12, in addition to the rendering capability setting part 11. The system operation status detecting part 12 is a part for detecting the actual operation status of the system, and monitors the CPU operation status (CPU load factor) or the status as to whether or not a dedicated device such as a graphic accelerator is used. The polygon rendering capability detecting part 10a can detect the hardware processing capability that is available to the processing for rendering three-dimensional polygons of the system resource.

It is assumed that an application other than an application for three-dimensional graphics display is being executed on a computer that can provide the system resource for the three-dimensional polygon display system. For example, the processing for displaying three-dimensional graphics is being executed on one window, and network communication with a large capacity data file is being executed on another window. In this manner, since the three-dimensional polygon display system has load other than a graphics display process, the hardware processing capability determined by the hardware resource allowed for the computer cannot entirely be introduced to the graphics display process.

The processing capability of the entire hardware including the CPU processing capability and a graphics accelerator of the computer that can provide the three-dimensional polygon display apparatus is denoted by A0. The processing capability necessary for processing an application being executed other than the graphics display is denoted by B. The system operation status detecting part 12 monitors the load status of the CPU and the operation statues of other hardware resources so that the processing capability B consumed by processing for other applications can be detected. The polygon rendering capability detecting part 10a calculates the processing capability A that can be used for the graphics display process by using the equation of A=A0−B, where A0 is the processing capability of the entire hardware, and B is the processing capability consumed by processing for other applications, which is detected by the system operation status detecting part 12. Then, the total number of polygons $N_{ap}$ that can be processed for rendering, as described in Embodiment 1, is calculated with the calculated processing capability A that can be utilized for the graphics display process. The subsequent processes including a process by the visual quality determining part 20 with the calculated $N_{ap}$ are performed. In other words, the process for calculating the visual quality $S_p$ using Equation 8 by the visual quality determining part 20 and the process for calculating $N_p$ using Equation 9 by the optimum polygon number calculating part 30 are performed in the same manner as in Embodiment 1.

As described above, according to the three-dimensional polygon display apparatus of Embodiment 2, in the case where the three-dimensional polygon display apparatus is not used exclusively for computer graphics but is used in an environment where a plurality of applications can be executed with multi-windows, the polygon rendering capability can be detected in view of the processing capability that actually is allowed for rendering polygons of the hardware processing capability.

Embodiment 3

Figure 6:
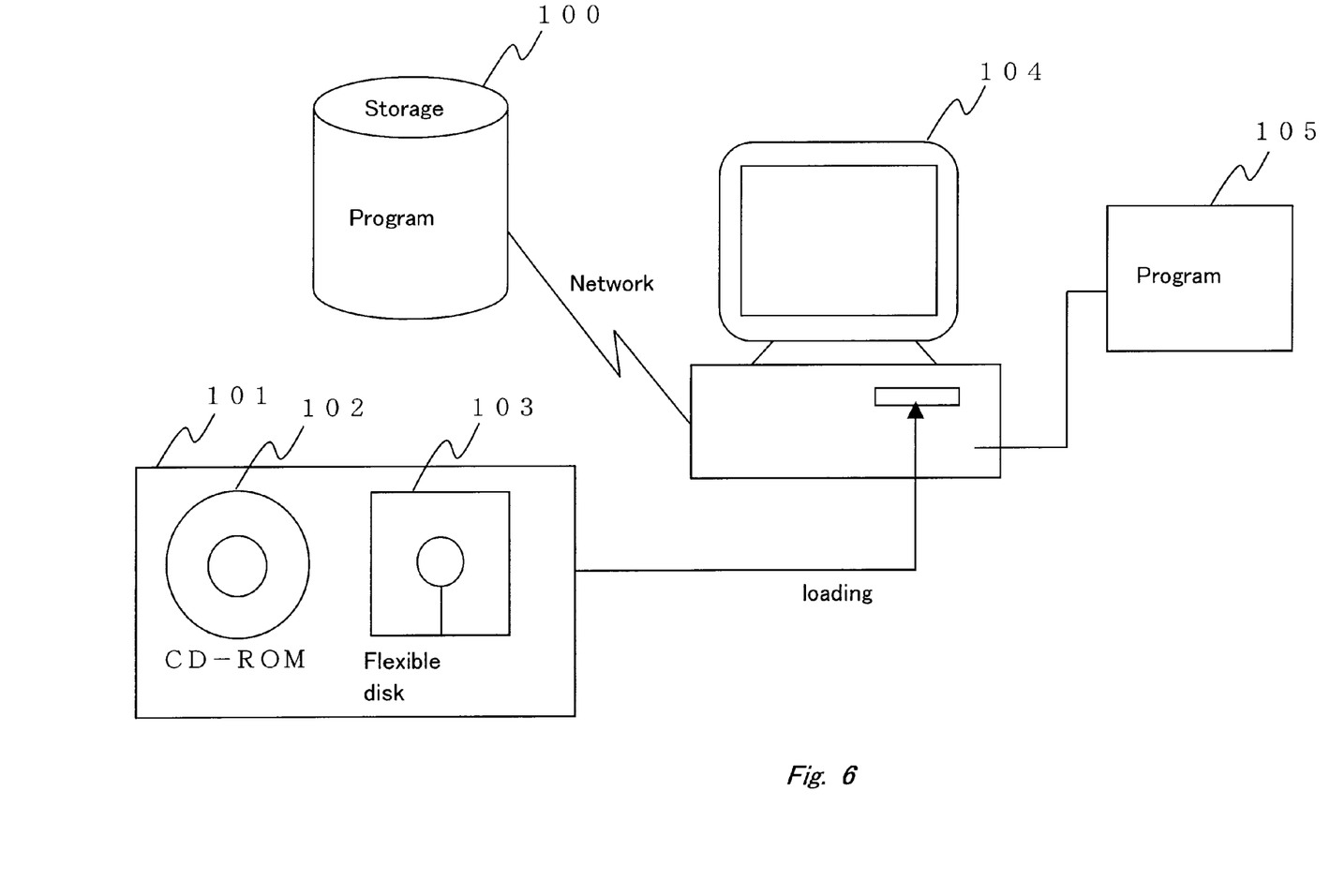
FIG. 6 is a diagram showing an example of a recording medium of Embodiment 3 of the present invention.

The three-dimensional polygon display apparatus of the present invention can be realized on: various computers by providing the recording medium which stores programs comprising the processes for realizing the above-described embodiments on a computer-readable recording medium. The recording medium in which the programs for realizing the three-dimensional polygon display system of the present invention are recorded can be not only a transportable recording medium 101 such as a CD-ROM 102 or a flexible disk 103, but also a recording medium 100 in a recording device on a network or a recording medium 105 such as a hard disk and a RAM of a computer, as shown in FIG. 6. When executing the program, the program is loaded into a computer 104 and executed in its main memory.

Using the recording medium in which the process steps are recorded of Embodiment 3, the three-dimensional polygon display system for allocating the optimum number of polygons for constant visual degree of the details represented on the screen and constant visual quality, which is picture quality perceived by the user, can be realized.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A three-dimensional polygon display apparatus using progressive polygon data for forming a polygon mesh of a three-dimensional character, comprising:

a visual quality determining part for determining visual quality, that is defined by an average area represented by one polygon on a display screen and indicates picture quality perceived by a user;

an optimum polygon number calculating part for calculating a number of polygons, that can be allocated to the three-dimensional character while maintaining the determined visual quality as a constant, as an optimum number of polygons; and a polygon number adjusting part for adjusting a progressive polygon level so that a number of polygons of the three-dimensional character is not less than the calculated optimum number of polygons and is a smallest number of polygons to which the number of polygons can be reduced.

2. The three-dimensional polygon display apparatus according to claim 1, comprising a polygon rendering capability detecting part for detecting hardware processing capability that defines a total number of polygons $N_{ap}$ that can be rendered in one frame of the three-dimensional polygon display apparatus.

3. The three-dimensional polygon display apparatus according to claim 2, wherein the visual quality determining part calculates the visual quality $S_p$ using a unit length w (pixels) on a display screen, an area $S_r$ of the three-dimensional character, the total number of polygons $N_{ap}$ that can be rendered in one frame, a distance Z between the three-dimensional character and a camera and ½ of an angle of view θ from the camera to the display screen as parameters according to:

$$Sp = \left(\frac{w}{2Z\tan\frac{\theta}{2}}\right)^2 Sr \Big/ \frac{Nap}{2} = \frac{W^2 Sr}{2NapZ^2\tan^2\frac{\theta}{2}}.$$

4. The three-dimensional polygon display apparatus according to claim 3, wherein the optimum polygon number calculating part calculates the optimum number of polygons $N_p$ using a unit length w (pixels) on a display screen, an area $S_r$ of the three-dimensional character, a distance Z between the three-dimensional character and a camera, ½ of an angle θ view a from the camera to the display screen, and the visual quality $S_p$ as parameters according to:

$$Np = \frac{w^2}{2Z^2\tan^2\frac{\theta}{2}} \frac{Sr}{Sp}.$$

5. The three-dimensional polygon display apparatus according to claim 2, wherein the polygon rendering capability detecting part detects a polygon rendering capability based on a proportion of a capability that is allowed to render polygons to the hardware processing capability of the three-dimensional polygon display apparatus.

6. The three-dimensional polygon display apparatus according to claim 5, wherein the visual quality determining part calculates the visual quality $S_p$ using a unit length w (pixels) on a display screen, an area $S_r$ of the three-dimensional character, the total number of polygons $N_{ap}$ that can be rendered in one frame, a distance Z between the three-dimensional character and a camera, and ½ of an angle of view θ from the camera to the display screen as parameters according to:

$$Sp = \left(\frac{w}{2Z\tan\frac{\theta}{2}}\right)^2 Sr \Big/ \frac{Nap}{2} = \frac{W^2 Sr}{2NapZ^2\tan^2\frac{\theta}{2}}.$$

7. The three-dimensional polygon display apparatus according to claim 6, wherein the optimum polygon number calculating part calculates the optimum number of polygons $N_p$ using a unit length w (pixels) on a display screen, an area $S_r$ of the three-dimensional character, a distance Z between the three-dimensional character and a camera, ½ of a angle view θ from the camera to the display screen, and the visual quality $S_p$ as parameters according to:

$$Np = \frac{w^2}{2Z^2\tan^2\frac{\theta}{2}} \frac{Sr}{Sp}.$$

8. The three-dimensional polygon display apparatus according to claim 1, wherein the polygon data of the three-dimensional character is progressive polygon data, and the polygon number adjusting part lowers the progressive polygon level until a number of polygons to be allocated to the three-dimensional character becomes a number of polygons nearest to the calculated optimum number of polygons $N_p$.

9. A method for displaying three-dimensional polygons using progressive polygon data for forming a polygon mesh of a three-dimensional character, comprising:

a visual quality determining step of determining visual quality, that is defined by an average area represented by one polygon on a display screen and indicates picture quality perceived by a user;

an optimum polygon number calculating step of calculating a number of polygons that can be allocated to the three-dimensional character while maintaining the determined visual quality as a constant, as an optimum number of polygons; and a polygon number adjusting step of adjusting a progressive polygon level so that a number of polygons of the three-dimensional character is not less than the calculated optimum number of polygons and is a smallest number of polygons to which the number of polygons can be reduced.

10. The method for displaying three-dimensional polygons according to claim 9, comprising a polygon rendering capability detecting step of detecting hardware processing capability that defines a total number of polygons $N_{ap}$ that can be rendered in one frame of a three-dimensional polygon display apparatus that executes the method.

11. The method of displaying three-dimensional polygons according to claim 10, wherein the visual quality determining step calculates the visual quality $S_{ap}$ using a unit length w (pixels) on a display screen, an area $S_r$ of the three-dimensional character, the total number of polygons $N_{ap}$ that can be rendered in one frame, a distance Z between the three-dimensional character and a camera, and ½ of an angle of view θ from the camera to the display screen as parameters according to:

$$Sp = \left(\frac{w}{2Z\tan\frac{\theta}{2}}\right)^2 Sr \Big/ \frac{Nap}{2} = \frac{W^2 Sr}{2NapZ^2\tan^2\frac{\theta}{2}}.$$

12. The method for display three-dimensional polygons according to claim 11, wherein the optimum polygon number calculating step calculates the optimum number of polygons $N_p$ using a unit length w (pixels) on a display screen, an area $S_r$ of the three-dimensional character, a distance Z between the three-dimensional character and a camera, ½ of an angle of view θ from the camera to the display screen, and the visual quality $S_p$ as parameters according to:

$$Np = \frac{w^2}{2Z^2\tan^2\frac{\theta}{2}} \frac{Sr}{Sp}.$$

13. The method for displaying three-dimensional polygons according to claim 9, wherein the polygon data of the three-dimensional character is progressive polygon data, and the polygon number adjusting step lowers the progressive polygon level until a number of polygons to be allocated to the three-dimensional character becomes a number of polygons nearest to the calculated optimum number of polygons $N_p$.

14. A computer-readable recording medium storing a program for realizing a three-dimensional polygon display apparatus using progressive polygon data for forming a polygon mesh of a three-dimensional character in accordance with display resolution, comprising:

a visual quality determining step of determining visual quality that is defined by an average area represented by one polygon on a display screen and indicates picture quality perceived by a user;

an optimum polygon number calculating step of calculating a number of polygons, that can be allocated to the three-dimensional character while maintaining the determined visual quality as a constant, as an optimum number of polygons; and a polygon number adjusting step of adjusting a progressive polygon level so that a number of polygons of the three-dimensional character is not less than the calculated optimum number of polygons and is a smallest number of polygons to which the number of polygons can be reduced.

* * * * *